(12) United States Patent  
Daniel

(10) Patent No.: US 8,805,558 B1  
(45) Date of Patent: Aug. 12, 2014

(54) GOLF VIDEO GAME AND SCORING METHOD

(76) Inventor: Isaac S Daniel, Miramar, FL (US)

( * ) Notice: Subject to any disclaimer, the term of this patent is extended or adjusted under 35 U.S.C. 154(b) by 19 days.

(21) Appl. No.: 13/465,585

(22) Filed: May 7, 2012

Related U.S. Application Data

(63) Continuation-in-part of application No. 12/378,066, filed on Feb. 11, 2009, now Pat. No. 8,644,507, and a continuation-in-part of application No. 12/454,162, filed on May 13, 2009, now Pat. No. 8,249,254, and a continuation-in-part of application No. 12/614,122, filed on Nov. 6, 2009, and a continuation-in-part of application No. 13/448,001, filed on Apr. 16, 2012.

(60) Provisional application No. 61/482,809, filed on May 5, 2011, provisional application No. 61/476,106, filed on Apr. 15, 2011, provisional application No. 61/478,762, filed on Apr. 25, 2011, provisional application No. 61/478,834, filed on Apr. 25, 2011, provisional application No. 61/492,682, filed on Jun. 2, 2011.

(51) Int. Cl.  
*A63B 69/36* (2006.01)

(52) U.S. Cl.  
USPC ............. 700/92; 473/131; 473/151; 473/154; 473/161; 473/168; 473/169; 473/170; 473/171; 473/197; 473/407; 700/91; 700/93

(58) Field of Classification Search  
USPC ......... 473/131, 151, 154, 161, 168–170, 197, 473/409; 700/91–93  
See application file for complete search history.

(56) References Cited

U.S. PATENT DOCUMENTS

| | | | |
|---|---|---|---|
| 4,504,055 A * | 3/1985 | Wells ................................ 463/3 |
| 5,949,679 A * | 9/1999 | Born et al. ...................... 700/91 |
| 6,409,607 B1 * | 6/2002 | Libit et al. .................... 473/170 |
| 8,133,124 B2 * | 3/2012 | Braun et al. .................. 473/131 |
| 2009/0191929 A1 * | 7/2009 | Nicora .............................. 463/3 |
| 2009/0239685 A1 * | 9/2009 | Belton et al. ................. 473/409 |

* cited by examiner

*Primary Examiner* — Sunit Pandya  
(74) *Attorney, Agent, or Firm* — Carol N. Green, Esq.

(57) ABSTRACT

A method for conducting and scoring a golf video game, comprising determining the number of strokes it takes a team to complete a golf hole, wherein the team comprises of a plurality of players collectively playing one ball, allowing at least one player to take a strategic position further down the golf course ahead of where the ball is being played, and basing a score on the number of strokes the team collectively takes to complete the golf hole.

9 Claims, 5 Drawing Sheets

| TEAMS COMBINED HANDICAP | 3/16 HANDICAP ALLOWANCE | TEAMS COMBINED HANDICAP | 3/16 HANDICAP ALLOWANCE | TEAMS COMBINED HANDICAP | 3/16 HANDICAP ALLOWANCE |
|---|---|---|---|---|---|
| | | QUICK TIME GOLF HANDICAP ALLOWANCE | | | |
| 1 | 0 | 25 | 5 | 49 | 9 |
| 2 | 0 | 26 | 5 | 50 | 9 |
| 3 | 1 | 27 | 5 | 51 | 10 |
| 4 | 1 | 28 | 5 | 52 | 10 |
| 5 | 1 | 29 | 5 | 53 | 10 |
| 6 | 1 | 30 | 6 | 54 | 10 |
| 7 | 1 | 31 | 6 | 55 | 10 |
| 8 | 2 | 32 | 6 | 56 | 11 |
| 9 | 2 | 33 | 6 | 57 | 11 |
| 10 | 2 | 34 | 7 | 58 | 11 |
| 11 | 2 | 35 | 7 | 59 | 11 |
| 12 | 2 | 36 | 7 | 60 | 11 |
| 13 | 2 | 37 | 7 | 61 | 11 |
| 14 | 3 | 38 | 7 | 62 | 12 |
| 15 | 3 | 39 | 7 | 63 | 12 |
| 16 | 3 | 40 | 8 | 64 | 12 |
| 17 | 3 | 41 | 8 | 65 | 12 |
| 18 | 3 | 42 | 8 | 66 | 12 |
| 19 | 4 | 43 | 8 | 67 | 13 |
| 20 | 4 | 44 | 8 | 68 | 13 |
| 21 | 4 | 45 | 8 | 69 | 13 |
| 22 | 4 | 46 | 9 | 70 | 13 |
| 23 | 5 | 47 | 9 | 71 | 13 |
| 24 | 5 | 48 | 9 | 72 | 14 |

FIG. 1C

GOLF VIDEO GAME AND SCORING METHOD

PRIORITY CLAIM

The present application is a Non-Provisional patent application based on U.S. Provisional Patent Application Ser. No. 61/482,809, titled "Golf Video Game and Scoring System," filed May 5, 2011, by Isaac S. Daniel, and a Continuation-in-Part of U.S. patent application Ser. No. 13/448,001, titled "Golf Game and Scoring Method," filed on Apr. 16, 2012, by Isaac S. Daniel, et al; U.S. patent application Ser. No. 12/378,066, titled "A Game Apparatus, System, and Method for Improving In-Game Communications During a Game Ser. No. 12/378,066, filed on Feb. 11, 2009, by Isaac S. Daniel, et al; U.S. patent application Ser. No. 12/454,162, titled "An Apparatus, System and Method for Reporting a Player's Game Plays During a Game," filed May 13, 2009, by Isaac S. Daniel; and U.S. patent application Ser. No. 12/614,122, titled a "System and Method of Distributing Game Play Instructions to Players During a Game," filed on Nov. 6, 2009, by Isaac S. Daniel; U.S. Provisional Patent Application Ser. No. 61/476,106, titled "Golf Game and Scoring Method," filed Apr. 15, 2011; U.S. Provisional Patent Application Ser. No. 61/478,762, titled "Golf Game and Scoring Method," filed Apr. 25, 2011; U.S. Provisional Patent Application Ser. No. 61/478,834, titled "Golf Reality Television Show," filed Apr. 25, 2011; U.S. Provisional Patent Application Ser. No. 61/492,682, titled "Smart Golf Tee," filed Apr. 25, 2011, whose priorities are claimed, and which are hereby incorporated by reference as if fully stated herein.

FIELD

The present disclosure relates generally to videogames and sports, and more specifically, to the game of golf and variants thereof.

BACKGROUND

Traditionally, golf has been played as a game that emphasizes the skills of the individual player, and their ability to complete a hole in as few shots as possible. Because golf is and individual sport, a player has traditionally been required to possess a broad range of skills for various types of shots, such as driving the ball, hitting the ball in the rough or sand trap, hitting the ball on the fairway, chipping, and putting. Furthermore, the player has been charged with ultimately determining their game's strategy, such as club selection, ball spin, and shot strategy (i.e. whether to try and shoot directly for the green, risking an overshot, or attempting to lay up and chip onto the green).

The individualistic nature of golf has been criticized as being boring and uninteresting, since the pace of the game is generally slow and if a certain player is off, they usually do not stand a chance at winning. The aforementioned issues may be extended to golf video games as well.

SUMMARY

The various embodiments of games and methods described herein result from the realization that videogames of golf and other variants thereof may be made more interesting and exciting by providing new golf videogame and scoring system that combines the traditional rules of golf with team play, and incorporates the time into the scoring system.

Accordingly, the various embodiments and disclosures described herein solve the limitations of the prior art in a new and novel manner.

BRIEF DESCRIPTION OF THE DRAWINGS

FIG. 1C is a chart depicting a scoring method in accordance to one embodiment;

DETAILED DESCRIPTION OF PREFERRED EMBODIMENTS

Figure 1A:
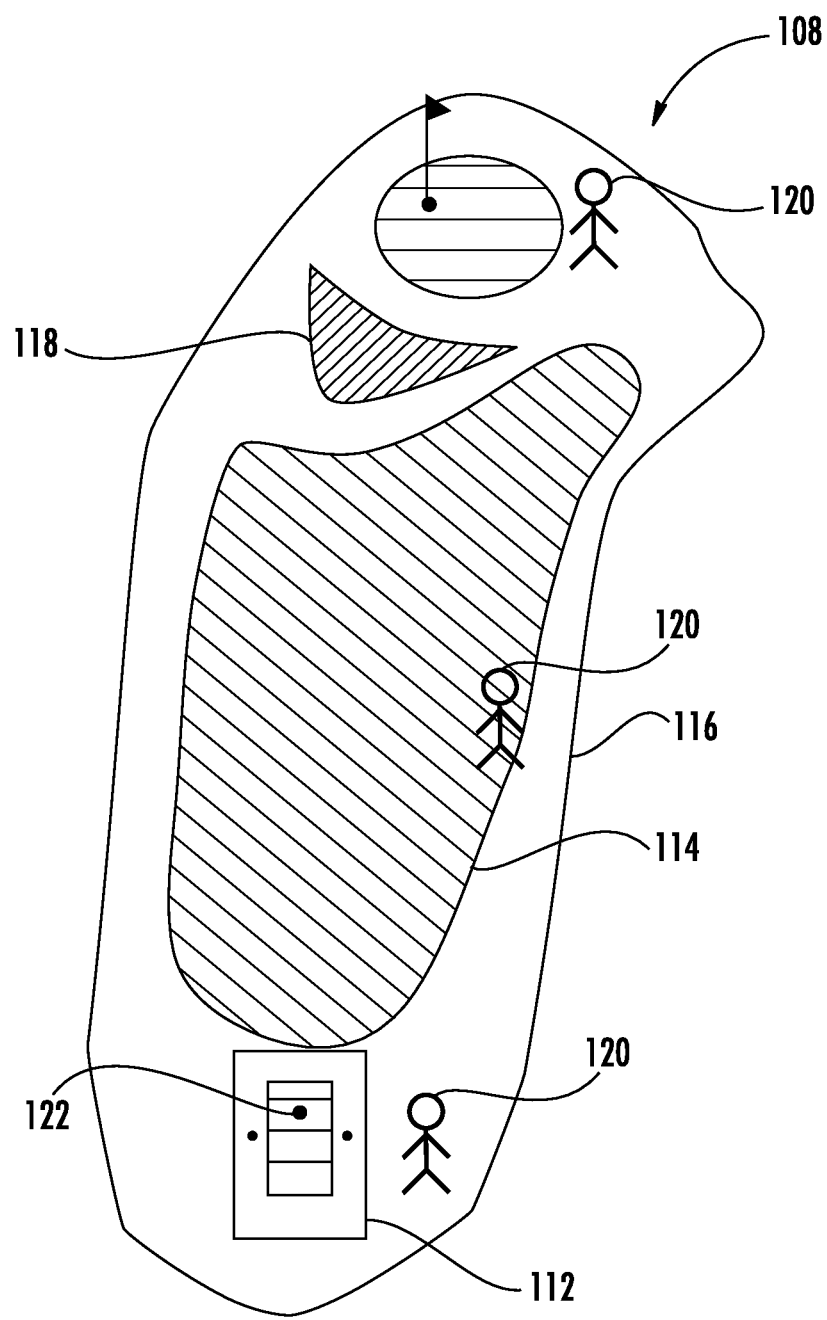
FIG. 1A is diagram depicting a golf hole in accordance with one embodiment.
Figure 1B:
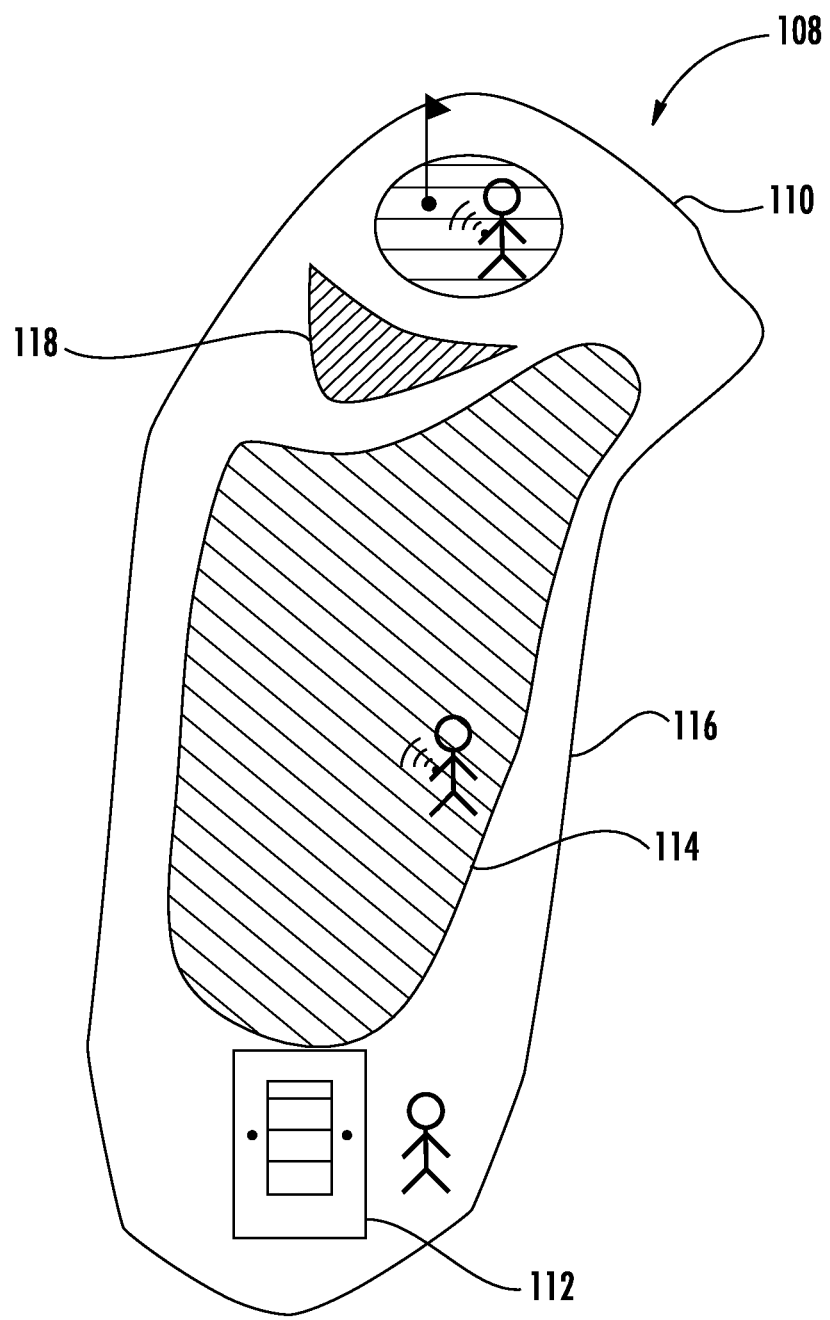
FIG. 1B is a diagram depicting a golf hole in accordance with another embodiment.

Referring now to FIGS. 1A, 1B, and 1C, a method for playing and scoring a golf videogame is shown according to various embodiments, wherein in one embodiment, the method comprises determining a number of strokes it takes a team to complete a golf hole 108, wherein the team comprises a plurality of players 120 collectively playing one ball 122, allowing at least one player 120 to take a strategic position further down the golf course ahead of where the ball is being played, and basing a score on the number of strokes the team collectively takes to complete the golf hole.

In some embodiments, the term "golf" refers to the game of golf as played according to the traditional rules, however in some embodiments the traditional rules may be modified, redacted, or amended as described herein. The term "player" may refer to an actual human player, or a virtual player or avatar controlled by a human. The term "video game" may refer to any type of electronic game, such as a virtual game, a computer game, and the like, and may be played on any computer, video gaming console, mobile device, and the like. The video game may also be stored and accessed from a computer readable medium, such as a CD or DVD.

The term "predetermined amount of time", or "predetermined time constraint", as used herein, may refer to any predetermined amount of time, as measured in seconds, minutes, hours, or any other unit of time. The amount of time may be predetermined at any point, or may be determined in real time, or instantly.

In some embodiments the time it takes to complete a golf hole is measured from the point at which the ball is teed off until the ball is holed.

The number of strokes taken by a team in completing the golf hole may include the number of strokes taken by the team as a whole.

In some embodiments, the golf hole may comprise a traditional golf hole, such golf hole 108 (shown in FIG. 1A), which may include a green 110, a tee box 112, a fairway 114, a rough 116, a sand trap 118, a water hazard (not shown), amongst other things.

In one embodiment, the method may further comprise requiring that the team comprise of a plurality of players, wherein each player may be responsible for at least one specific skill or at least one specific shot. The at least one specific skill may be any kind of skill, such as a driving skill, a putting skill, a chipping skill, a short iron skill, a long iron skill, a sand trap skill, a rough skill, and a trick shot skill. A trick shot skill may include skipping the ball off of a surface, such as water, cement, and the like. The at least one specific shot may be any kind of shot, such as a drive, a fairway shot, a rough shot, a sand trap shot, a chip, a putt, a trick shot, a slice, a draw, a fade, a hook, a push, a pull, a backspin shot, a forward spin shot, a side spin shot, a lob, a skip, a shot, a thin shot, and a sky hook. The players make take turns in being responsible for a specific shot or skill throughout the game.

In some embodiments, the method may further comprise requiring team members to take consecutive turns playing the same ball beginning with the tee off and continuing until the ball has been holed. In a further embodiment, the method may require that each team member charged with at least one specific skill or at least one specific shot play the ball in the lie that requires each team member's specific skill or specific shot.

For example, the player responsible for driving the ball may tee off, then the player responsible for a long iron shot may hit the next shot, the following player responsible for the short range shots may chip the ball on the green, and then the player responsible for putting may putt the ball in the hole.

In some embodiments, the method may require that no single team member play a consecutive shot, so that each player cannot play the next stroke after they have played.

In yet a further embodiment, the method comprises requiring that no single team member tee off on consecutive holes, so that each player cannot tee off on two consecutive holes.

In yet another embodiment, the method may require that a tee off on one hold commence within a predetermined amount of time after completion of a prior hole. Such a rule would speed up the game and make it more exciting for players and spectators alike. In the various embodiments of the method where time constraints are called for, the time constraint may make the game more exciting and speedy for players and spectators alike.

In some embodiments, the method may comprise allowing individual team members to communicate using at least one wireless device, such as a communications device. The communications device may be any kind of device, such as an audio device, which may include a walkie talkie, microphone, wireless phone, and the like, a video device, such as camera, and the like, an audio-video device, such as a PDA, tablet PC, or smartphone, or a data communications device. The communications devices may use a local network, such as a WiFi network, a WiMax network, Zigbee, and the like, or may use a wider network, such as a GSM network or the internet to communicate. The players may wear or carry the wireless devices on their bodies while playing.

In some embodiments, the wireless device may be any of those embodiments of wireless or communications devices described in any of the patent applications and patents mentioned in the priority claim above, all of which are incorporated by reference in their entirety.

In some embodiments, communicating using at least one wireless device comprises transmitting plays, shots, or strokes, or types thereof, player location, ball location, club selection, or course conditions, such as weather, greens conditions, hazards, wind, and the like. By allowing communication using wireless devices, players may be allowed to strategize their game remotely and during the game.

Wireless communications may be useful to team members since it allows them to communicate across distances, and in cases where players are located in different geographical positions, but are playing a golf video game together on an online network.

It should be noted that since some embodiments call for time to be a factor in scoring, team members may want to disperse themselves throughout the course, being ready to hit the next shot as soon as it lands near them. Wireless communications would be especially effective because team members (including coaches) would be able to communicate during games.

In some embodiments, the team may comprise a coach, wherein the coach may keep track of time, may select play or shot types for the players, may select clubs, and may choose players for performing specific shots. The coach may communicate with the players using the wireless communications device. The coach may be positioned remotely from the course, such as in a coaches viewing box, wherein a plurality of display devices may show the activities on the golf course and a means for allowing communications between coaches and players alike.

The term "team mate," "team player," "player," "coach," or the like, may refer to an actual person playing the golf video game, as well as the various player avatars they control in the video game. Accordingly, any and all of the various golf equipment and golf objects, such as clubs, courses, holes, strokes, rules, and the like, used herein may refer to virtual equivalents of actual golf objects, equipment, rules, and terms.

In one embodiment, the method may require that team members abstain from using certain equipment, such as golf clubs, or particular types of golf clubs, golf balls, golf bags, golf carts, pull carts, tees, and the like.

In some embodiments, the method may call for the traditional golf handicapped system to be implemented where the handicap may be based on either strokes, time, or points.

Referring now to FIG. 1C, in some embodiments, at least one player must play off a maximum predetermined handicap. Such predetermined handicap may be any handicap, including, but not limited to 18. In yet another embodiment, the team handicap allowance is a predetermined fraction of a combined total handicap, wherein said predetermined fraction may be any type of fraction, including, but not limited to, $3/16^{th}$.

In further embodiments, a method for playing and scoring a golf game comprises: determining the amount of time it takes a team to complete a golf hole 108, wherein the team comprises of a plurality of players 120 collectively playing one ball, allowing at least one player to take a strategic position further down the golf course ahead of where the ball is being played, and basing a score on the amount of time the team collectively takes to complete the golf hole.

In some embodiments, basing a score on the amount of time the team collectively takes to complete a golf hole comprises basing a score on whether the team completes the golf hole within a predetermined time constraint. In some embodiments, the predetermined time constraint may be based on the par of the hole. For example, the predetermined time constraint may be longer on a par five, as opposed to a par four or a par three, which may have shorter time constraints.

In some embodiments, basing a score on the amount of time the team collectively takes to complete the golf hole comprises basing a score on whether the team completes a milestone within a predetermined time constraint, such as reaching the green, completing the green portion, and the like. In some embodiments, the time being measured is reset after the team completes the milestone, such as reaching the green.

In one embodiment, basing a score on the amount of time the team collectively takes to complete the golf hole comprises assigning a better score to the team if they reach the green before a predetermined time constraint, assigning a better score to the team if they complete the green portion of the hole before a predetermined time constraint, assigning a worse score to the team if they fail to reach the green before a predetermined time constraint, and assigning a worse score to the team if they fail to complete the green portion of the hole before a predetermined time constraint.

Other Examples of Various Embodiments of Videogame Formats and Rules:
1. Time Trials:
   a. In Time Trial Game Mode, it's one player at a time trying to achieve the fastest possible time with the least amount of strokes.
      1. For example, player 1 would begin after the countdown. He would then accurately aim and hit the ball, then quickly tapping the buttons he would run to the ball. He would continue these steps unit he gets the ball in the hole.
         a. More strokes used, more time is added on to the final time.
2. Head to Head ("H2H" Challenge)
   a. In Head to Head Challenge mode, 2 players face off against each other at the same time. Utilizing a vertical or horizontal match up screen players can view how well the other player is doing.
   b. Same rules apply as in time trials, but now you have the pressure of seeing your opponent live in action.
3. Speed Course
   a. In Speed Course mode, 2 players are on the same field at the same time.
      i. Gameplay in this mode is similar to H2H mode however it is possible for player 1's ball to hit player 2's ball causing it to roll into a bunker, lake, or into the rough.
4. Team Head to Head Challenge
   a. In Team H2H mode, 2 teams of 2 play against each other.
      i. Gameplay is similar to H2H mode however players can choose to view both opponents or focus on one opponent while trying to achieve the fastest time.
      ii. Team with lowest total team time is the victor
5. Chaotic Challenge
   a. In Chaotic Challenge mode, 3 or players will be on the same field at the same time. Like being at a golf range, players will line up and once the game start, hit the ball until they get it in the hole.
   b. Following the same rules as speed course, players' balls will be able to hit each other. Players however will not be allowed to hit an enemy player's ball.
6. Hardcore mode
   a. In this mode all of the same gameplay remain the same, however with hardcore mode on players will lose skill points when they lose matches. The courses will also be more intense with smaller fairways, more bunkers, more water hazards, etc. Also penalties will be increased by 15%.
   b. Hardcore mode will also have the enhanced method for players to run to their balls. Players will have to alternate pressing keys to run to their ball. The faster the keys are pressed the faster their characters would move. Depending on players speed skill level it will be easier or harder to maintain high run speeds. This is also affected by the players stamina skill. The figure below should how the key's should be pressed.
   c. This mode is for high skilled players only, who are level 10 or higher.

Figure 1D:
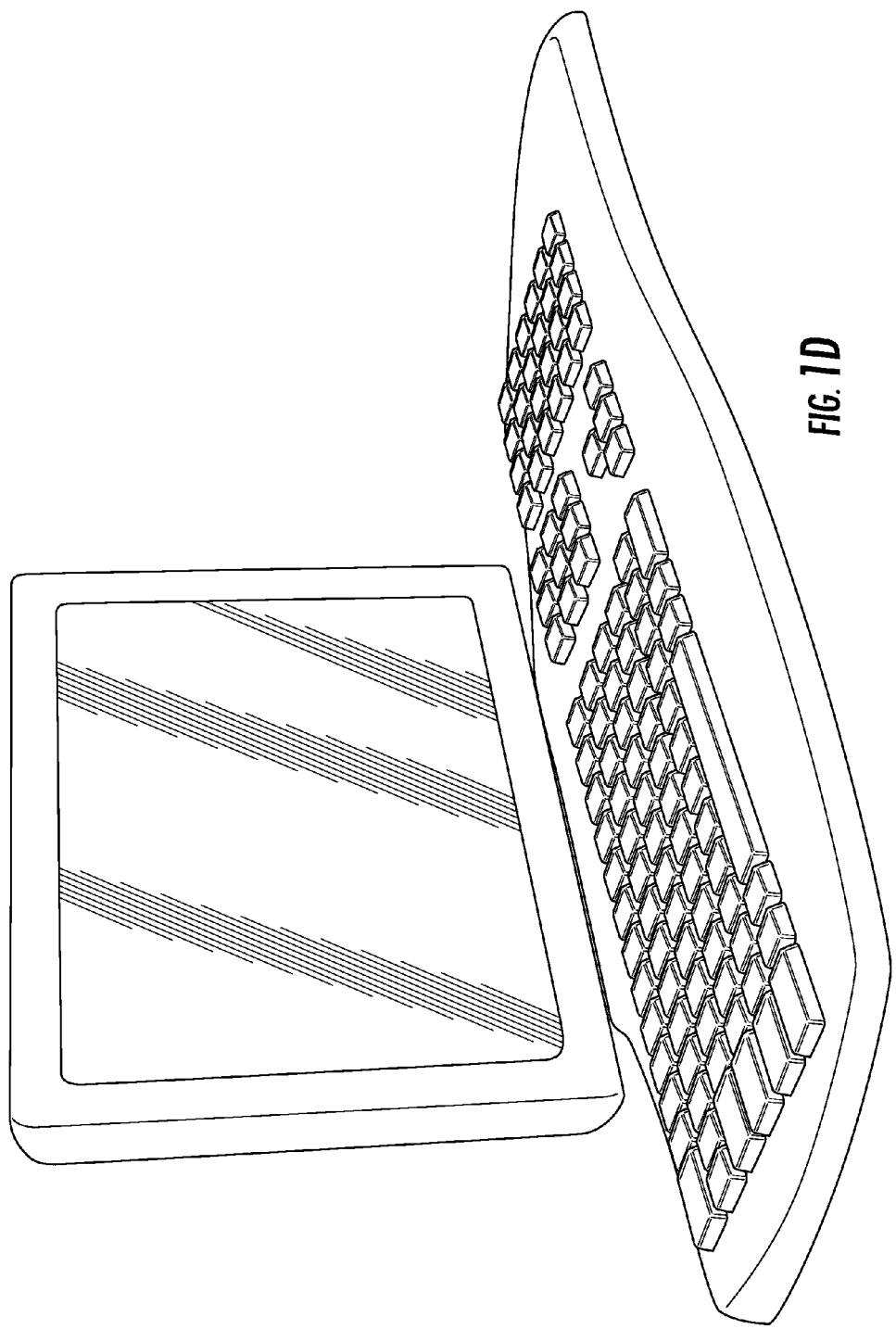
FIG. 1D is a user input device according to one embodiment.

In some embodiments, a user input device especially designed for the game may be provided to users, such as user input device shown in FIG. 1D. Users or players may interact with the video game by using other input devices, such as a controller (wireless or wired), a motion sensing controller, a gesture control system (which may comprise of 3D cameras and gesture control middleware), a keyboard, a joystick, and the like.

Examples of Skill Points and Skill Level Issuance, Apportionment, and Usage:
   New Players will be given a certain amount of skill points initially, wherein players may distribute those points across a variety of skills. Players can then take those points and apportion them into the stats they feel will help their gameplay the best.
Various embodiments of player skills:
   Accuracy—Increasing this stat will allow players to aim the ball easier. The Accuracy bar will grow as players accuracy stat increases.
   Speed—Increasing this stat will allow players to run faster to the ball.
   Stamina—Increasing this stat will allow players to hold their running speeds for longer periods of time.
   Reaction—Increasing this stat will allow players' characters to react faster to after a ball is hit to getting ready to hit a next ball.
   Power—Increasing this stat will allow players to hit the ball greater distances. A power indicator and circle may be provided in the video game, wherein the power indicator may comprise a circular indicator wherein the power a player chooses to hit a ball with may vary according to where the power indicator is along the circle. As the power skill increases, the indicator will move more slowly along the power circle thus allowing players to more easily select the power level they wish to hit a ball with.
   As players play the various game modes they will be awarded skill points to increase their skills.
Examples of Player Levels
   Players achieve levels by winning matches. As players achieve higher levels their maximum skill points they can achieve may grow as well. For example, a player can get a maximum of 10 power skill points which will allow him to hit the ball 50 yards, while a level 10 player can get a maximum of 100 power skill points which will allow him to hit the ball 250 yards. Higher level players also get nice unlocks which are explained below.
   Examples of Unlockable Items and Features:
While leveling up, players may have a chance to gain unlocks. Unlocks can include clubs, balls, shoes, pants, and the like. Each unlocked item may have associated statistics or skills with it. For example, a specific golf club could increase a player's power and accuracy. Another example would be a player unlocking a specific golf ball, which would increase the player's stats in power, accuracy and reaction.
Example of Various Embodiments of Score Calculations
   Players' score is determined by adding the total strokes, the time it takes to get into the hole and the penalty times. For example if player X takes 5 strokes and 15 minutes to get the ball into hole 1, his score is 20.
   Time is rounded off to the nearest minute, so 3 minutes and 20 seconds would equal 3 minutes.
   Penalties can occur from hitting the ball into various hazards:
      Sand bunkers=+5 minutes
      Water=+10 minutes
      Rough=+2 minutes
   The total score is determined by adding the individual scores for all 18 holes.
   Example of Player Achievements and Milestones
While playing the various game modes players have a chance to gain several achievements. Each achievement has an associated point scale with it. Achievements and achievement points do not affect players skills or levels, however various achievements have titles as unlocks, such as Ace or Ambassador. Achievements and achievement points gives players a task to try to achieve as well as a tool to brag about.

Terms and Acronyms Used Herein

MMO: Massively Multiplayer Online

H2H—Head to Head

Bunker—A depression in bare ground that is usually covered with sand. AKA "sand trap"

Stroke—The act of swinging a golf club at a golf ball

Rough—The grass that borders the fairway, usually taller and coarser than the fairway Hardware and Operating Environment This section provides an overview of example hardware and the operating environments in conjunction with which embodiments of the inventive subject matter can be implemented.

A software program, such as a golf video game, may be launched from a computer readable medium in a computer-based system to execute the functions defined in the software program. Various programming languages may be employed to create software programs designed to implement the system 100 and method 200 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 2 below.

Figure 2:
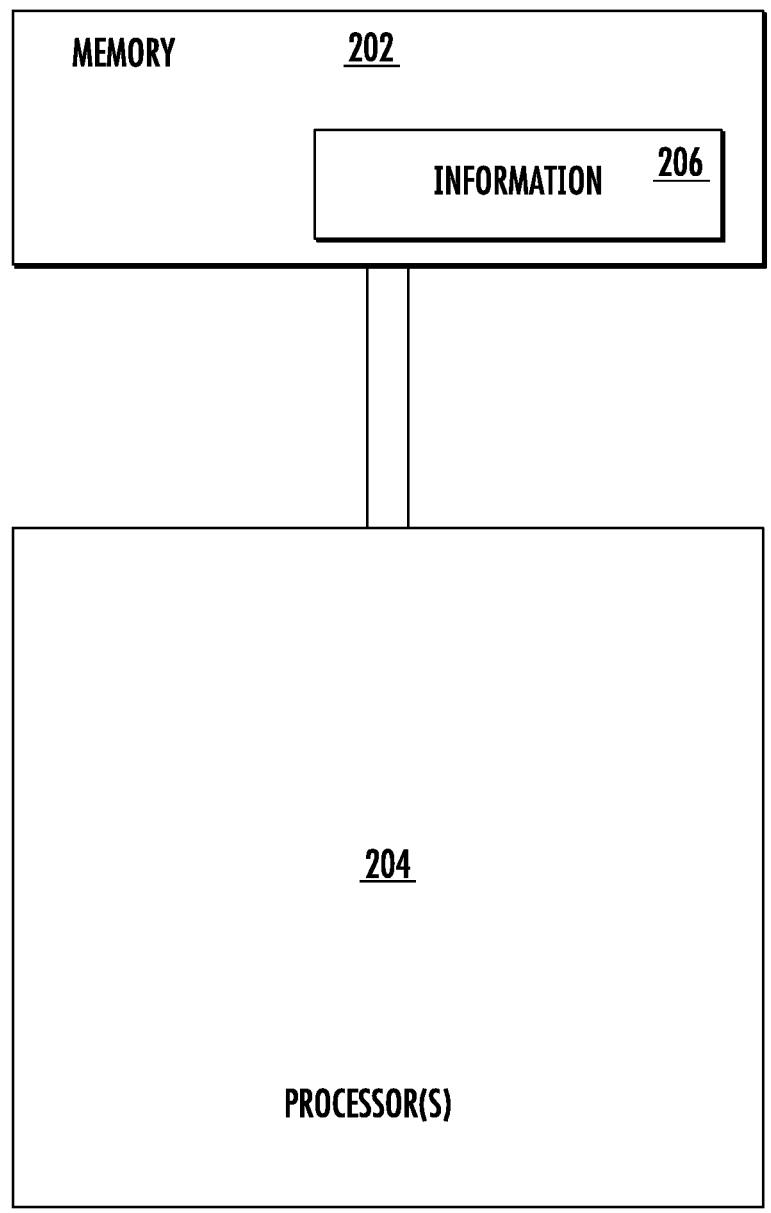
FIG. 2 is a block diagram depicting an apparatus or article in accordance with one embodiment.

FIG. 2 is a block diagram representing an apparatus 200 according to various embodiments. Such embodiments may comprise a computer, a video gaming console, a memory system, a magnetic or optical disk, some other storage device, or any type of electronic device or system. The apparatus 200 may include one or more processor(s) 204 coupled to a machine-accessible medium such as a memory 202 (e.g., a memory including electrical, optical, or electromagnetic elements). The medium may contain associated information 206 (e.g., computer program instructions, data, or both), which, when accessed, results in a machine (e.g., the processor(s) 204) performing the activities previously described herein.

The principles of the present disclosure may be applied to all types of computers, gaming consoles, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

The invention claimed is:

1. A computer implemented method for conducting and scoring a golf video game, comprising using at least one processor to perform any or all of the following:

a. determining a number of strokes it takes a team to complete a golf hole, wherein the team comprises of a plurality of players collectively playing one ball;
   b. allowing at least one of the plurality players to use a user input device to play the ball;
   c. assigning a specific skill to the at least one of the plurality of players;
   d. requiring the at least one of the plurality of players to play the ball in a lie that requires the specific skill assigned to the at least one of the plurality of players; requiring the plurality of players to take consecutive turns playing the same ball beginning with the tee off and continuing until the ball has been holed; and
   e. basing a score on the number of strokes the team collectively takes to complete the golf hole.

2. The method of claim 1, further comprising allowing at least one of the plurality of players to use the user input device to take a strategic position further down a golf course ahead of where the ball is being played.

3. The method of claim 1, wherein the specific skill is a type of skill selected from the group consisting essentially of: a driving skill, a putting skill, a chipping skill, a short iron skill, a long iron skill, a sand trap skill, a rough skill, and a trick shot skill.

4. The method of claim 1, further comprising requiring that a tee off on one hole commence within a predetermined amount of time after completion of a prior hole.

5. The method of claim 1, further comprising requiring that one or more of the plurality of players not play a consecutive shot.

6. The method of claim 1, further comprising requiring that one or more of the plurality of players not tee off on consecutive holes.

7. The method of claim 1, wherein the team further comprises at least one coach.

8. A non-transitory computer readable medium comprising:

a. computer executable instructions configured to perform a method for conducting and scoring a golf video game, comprising:
      i. determining a number of strokes it takes a team to complete a golf hole, wherein the team comprises of a plurality of players collectively playing one ball;
      ii. allowing at least one of the plurality players to use a user input device to play the ball;
      iii. assigning a specific skill to the at least one of the plurality of players;
      iv. requiring the at least one of the plurality of players to play the ball in a lie that requires the specific skill assigned to the at least one of the plurality of players; requiring the plurality of players to take consecutive turns playing the same ball beginning with the tee off and continuing until the ball has been holed; and
      v. basing a score on the number of strokes or time the team collectively takes to complete the golf hole.

9. The non-transitory computer readable medium of claim 8, wherein the specific skill is a type of skill selected from the group consisting essentially of: a driving skill, a putting skill, a chipping skill, a short iron skill, a long iron skill, a sand trap skill, a rough skill, and a trick shot skill.

\* \* \* \* \*